No. 734,320. PATENTED JULY 21, 1903.
J. F. GRIKA.
FOLDING CAR STEP.
APPLICATION FILED MAY 2, 1903.
NO MODEL.

Witnesses
Harry L. Amer
Herbert D. Lawson

Inventor
Joseph F. Grika.
By Victor J. Evans
Attorney

No. 734,320.

Patented July 21, 1903.

UNITED STATES PATENT OFFICE.

JOSEPH F. GRIKA, OF LENEXA, KANSAS.

FOLDING CAR-STEP.

SPECIFICATION forming part of Letters Patent No. 734,320, dated July 21, 1903.

Application filed May 2, 1903. Serial No. 155,372. (No model.)

*To all whom it may concern:*

Be it known that I, JOSEPH F. GRIKA, a citizen of the United States, residing at Lenexa, in the county of Johnson and State of Kansas, have invented new and useful Improvements in Folding Car-Steps, of which the following is a specification.

My invention relates to new and useful improvements in folding car-steps; and its object is to provide a simple device which may be readily attached to a car and which is inexpensive and durable and by means of which the step may be readily thrown into or out of operative position.

The invention consists in the novel construction and combination of parts hereinafter more fully described and claimed, and illustrated in the accompanying drawings, in which—

Figure 1:
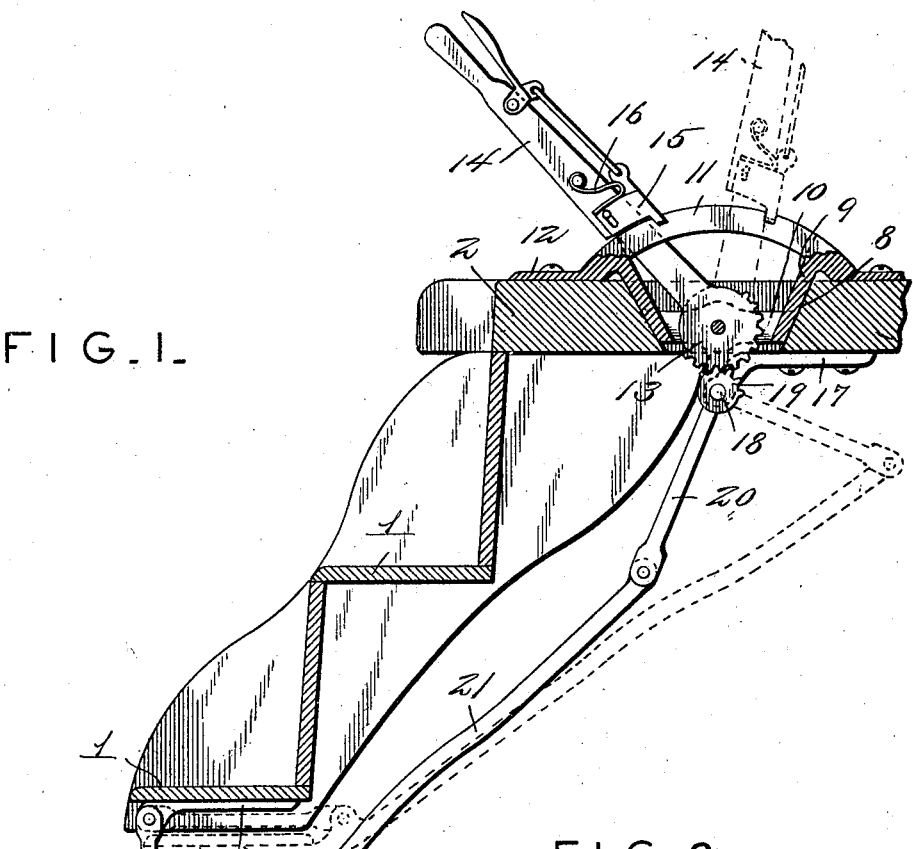
Figure 2:
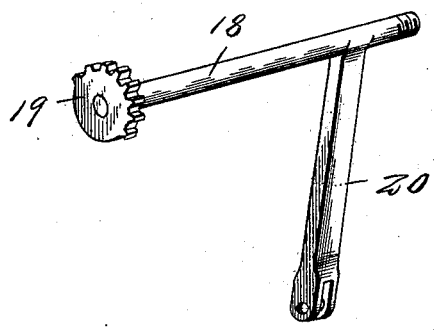
Figure 3:
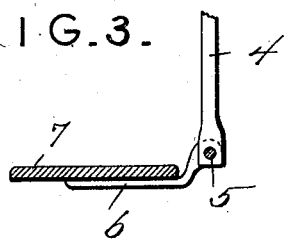

Figure 1 is a section through the steps of a car and showing my improved step-operating mechanism. Fig. 2 is a detail view of the operating-shaft of the mechanism, and Fig. 3 is an inner elevation of the hanger and support for the folding step.

Referring to the figures by numerals of reference, 1 1 are the steps of the car, which are fastened to the platform 2 in any suitable manner. To the under surface of the lower step 1 are fastened strips 3, to the forward end of each of which is pivoted a hanger 4. These car-hangers are connected at their lower ends by a rod 5, upon which are mounted brackets 6, which extend under and are secured to the folding or auxiliary step 7.

An aperture 8 is formed within the platform 2 at a point in rear of the step 1, and the end walls of this aperture are tapered and form bearings for inclined arms 9, which are connected at their lower ends by parallel cross-strips 10. These strips are integral with the arms 9, and said arms are also integral with a rack 11. Integral ears 12 extend longitudinally from the ends of the rack and are adapted to be fastened upon the platform in any suitable manner. Journaled to the cross-strips 10 is a gear 13, which is integral with the lower end of a lever 14, and a pawl 15 is slidably mounted upon this lever and is adapted to be operated in any suitable manner, so as to be raised out of engagement with any one of the recesses in the rack. The pawl is held normally in engagement with the rack by a spring 16, secured to lever 14.

Brackets 17 are fastened to the platform 2 at opposite sides of the aperture 8, and within these is journaled a shaft 18, having a gear 19 at one end, which meshes with the gear 13. An arm 20 extends downward from the shaft 18 at a point in alinement with the vertical center of the step 7, and the lower end of this arm is pivoted to a bar 21, which projects downward and is pivotally mounted upon the rod 5, hereinbefore referred to. An arm 22 extends from the lower end of the bar 21 and at an angle thereto, and this arm is adapted to project under the step 7 and support the same in a horizontal position.

It will be seen that by swinging the lever 14 in one direction the arm 20 will be swung toward the steps, and the bar 21 will therefore throw the hanger 4 downward into the position illustrated in Fig. 1. This movement of the parts will bring step 7 into operative position. By reversing the movement of lever 14 the parts will be moved in the opposite direction and into position illustrated by dotted lines in Fig. 1.

By forming the rack 11, ears 12, arms 9, and cross-strips 10 in a single casting the cost of the device is reduced to the minimum and displacement and loss of various portions thereof is prevented.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as may suggest themselves from time to time as may fairly fall within the scope of my invention.

Having thus described my invention, what I claim as new, and desire to secure by Letters Patent, is—

The combination with the platform of a car having an aperture therein and steps extending from the platform; of arms projecting into the aperture, cross-strips connecting the same, a rack arched over the arms, said rack, arms and cross-strips being formed in a single casting, a gear journaled between the cross-strips, a hanger extending therefrom and adapted to be locked to the rack, a shaft journaled below the platform, a gear thereon meshing with the gear of the lever, an arm extending from the shaft, a hanger pivoted to one of the steps, an auxiliary step pivoted to the hanger and a bar pivoted at opposite ends to the hanger and the arms of the shaft, said bar having a forwardly-projecting arm adapted to support the auxiliary step.

In testimony whereof I affix my signature in presence of two witnesses.

JOSEPH F. GRIKA.

Witnesses:
    JACOB O. STEVENS,
    GEO. HOFER.